United States Patent
Pallemulle et al.

(10) Patent No.: US 10,878,187 B1
(45) Date of Patent: *Dec. 29, 2020

(54) NETWORK-BASED CONTENT RENDERING

(71) Applicant: Amazon Technologies, Inc., Seattle, WA (US)

(72) Inventors: Sajeeva Lakmal Bandara Pallemulle, Woodinville, WA (US); Ameet Nirmal Vaswani, Bellevue, WA (US); Muneer Mirza, Bellevue, WA (US); Andrew James Guenther, Seattle, WA (US); Justin Jon Derby, Seattle, WA (US); Camilla de Oliveira Penna Tavares, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/840,899

(22) Filed: Dec. 13, 2017

(51) Int. Cl.
| | |
|---|---|
| *G06F 17/22* | (2006.01) |
| *G06F 40/197* | (2020.01) |
| *G06F 40/14* | (2020.01) |
| *H04L 29/08* | (2006.01) |

(52) U.S. Cl.
CPC ............ *G06F 40/197* (2020.01); *G06F 40/14* (2020.01); *H04L 67/02* (2013.01)

(58) Field of Classification Search
CPC ............. G06F 17/2288; G06F 17/2247; G06F 40/197; G06F 40/14
USPC ........................................................ 715/229
See application file for complete search history.

(56) References Cited

U.S. PATENT DOCUMENTS

| | | | |
|---|---|---|---|
| 9,294,553 B1* | 3/2016 | Vaswani | H04L 67/2847 |
| 2002/0103851 A1 | 8/2002 | Kikinis | |
| 2008/0289049 A1 | 11/2008 | Morris | |
| 2012/0254432 A1* | 10/2012 | Roseborough | H04L 67/06 709/226 |
| 2013/0159857 A1* | 6/2013 | Zaloshnja | H04L 65/605 715/716 |
| 2014/0053054 A1 | 2/2014 | Shen | |
| 2014/0207911 A1 | 7/2014 | Kosmach | |
| 2014/0281016 A1 | 9/2014 | Kennedy | |
| 2014/0300775 A1* | 10/2014 | Fan | H04N 5/23229 348/231.3 |
| 2015/0161277 A1* | 6/2015 | Heller | G06F 9/44526 715/229 |
| 2015/0193547 A1 | 7/2015 | Burkard | |
| 2015/0379014 A1* | 12/2015 | Xu | G06F 40/131 707/711 |
| 2018/0350146 A1* | 12/2018 | Gervasio | G06T 15/205 |
| 2018/0374188 A1* | 12/2018 | LV | G06F 12/145 |

* cited by examiner

*Primary Examiner* — Scott T Baderman
*Assistant Examiner* — Hassan Mrabi
(74) *Attorney, Agent, or Firm* — Knobbe, Martens, Olson & Bear, LLP (57) ABSTRACT

Generally described, one or more aspects of the present application correspond to a content rendering system. A content management service hosts content on behalf of the content provider. The content management service includes one or more rendering engines that receive content from the one or more content providers that are registered with the content management service. Each content rendering engine can be configured to receive a content resource and generate at least one piece of processed content that can be rendered on a user device.

21 Claims, 8 Drawing Sheets

NETWORK-BASED CONTENT RENDERING

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of third party service providers, such as a content delivery network ("CDN") service provider or other service provider. As with content providers, third party service providers are also generally motivated to provide requested content to client computing devices often with consideration of efficient transmission of the requested content to the client computing device or consideration of a cost associated with the transmission of the content. Accordingly, third party service providers often consider factors such as latency of delivery of requested content or performance of individual user devices in accessing requested content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, content providers can provide content to requesting users. In some embodiments, the content providers can utilize or incorporate third party service providers, such as CDN service providers or other service provider to deliver content to clients with increased efficiency or less latency. With regard to network-based content, a content provider can offer content to user devices that is requested in accordance with one of a range of communication protocols, such as the hypertext transfer protocol ("HTTP").

By way of illustrative example, a user operating a user device may input a domain name in a browser application to access a content page or to otherwise retrieve content from an identified content provider. In order to identify a network address (e.g., Internet protocol (IP) address) corresponding to the domain name, the browser application may submit a domain name service ("DNS") query. Illustratively, the DNS request is resolved by returning an IP address of a server computing device maintained by the identified content provider. Based on resolving the DNS query, the browser application can then issue HTTP-based requests to IP addresses requesting the content (e.g., a Web page), which itself can include references to one or more embedded resources that are also requested in a manner described above.

In some embodiments, user devices may have more limited access based on constrained bandwidth of the communication network (e.g., a limited bandwidth wireless connection) or limited resources in which to process embedded resources, such as graphic images, video files, executable code requiring data extensive exchanges, and the like. Such embodiments can be generally referred to as low bandwidth scenarios. In such low bandwidth scenarios, latencies associated with accessing and rendering the base resource and embedded resources can yield unacceptable user experiences.

One attempt to address issues related to rendering requested content in low bandwidth scenarios includes the content provider making mobile versions of the requested content that may limit the amount of content or provide lower resolution content to minimize the amount of data that is rendered to generate a version of the requested resource (e.g., a requested web page). In another approach, browser applications can be configured to filter out specific types of embedded content. For example, a browser application or other software can be configured to identify embedded resources corresponding to embedded advertisements and suppress or otherwise filter requests for this content to limit amount of data is required to be requested and rendered by the user device. While both of these approaches may assist in mitigation potential latencies associated with rendering "full" versions of requested content, such approaches suffer from limiting the content that is provided and rendered to the user. Additionally, in embodiments such as filtering advertisement content, such approaches can interfere with contractual obligations and performances by the content providers or other third-part service providers. One or more aspects of the present application can address the identified inefficiencies described with regard to the low bandwidth scenario solutions.

Generally described, one or more aspects of the present application correspond to a content rendering system. More specifically, in one aspect, one or more content providers can register with a service provider, such as a content management service to host content on behalf of the content provider. The content management service includes one or more rendering engines that receive content from the one or more content providers that are registered with the content management service. Illustratively, individual content rendering engines can be configured to receive unprocessed content from the content providers, such as HTML references and unexecuted code, and generate at least one piece of substantially processed content that can be rendered on a user device in a manner to mitigate data transmission over a communication network. Illustratively, the rendered content can be transmitted and rendered on user devices in a manner to mitigate the latencies associated with processing and rendering the underlying content at the client device.

After a content provider has been registered with the content rendering system, requests for content from one or more users are directed to the content management service. In one embodiment, the content rendering system processes the request by utilizing a rendering engine component to process and provide substantially rendered content to the requesting device. In another embodiment, the content rendering system can process the request by choosing from two or more content rendering engines to provide processed content ready for rendering. Illustratively, individual rendering engines can process content into different formats or be associated with different criteria, such as financial criteria or load criteria, that provide alternatives for providing the rendered content. A selected rendering engine then transmits the processed content to the requesting user device.

Figure 1:
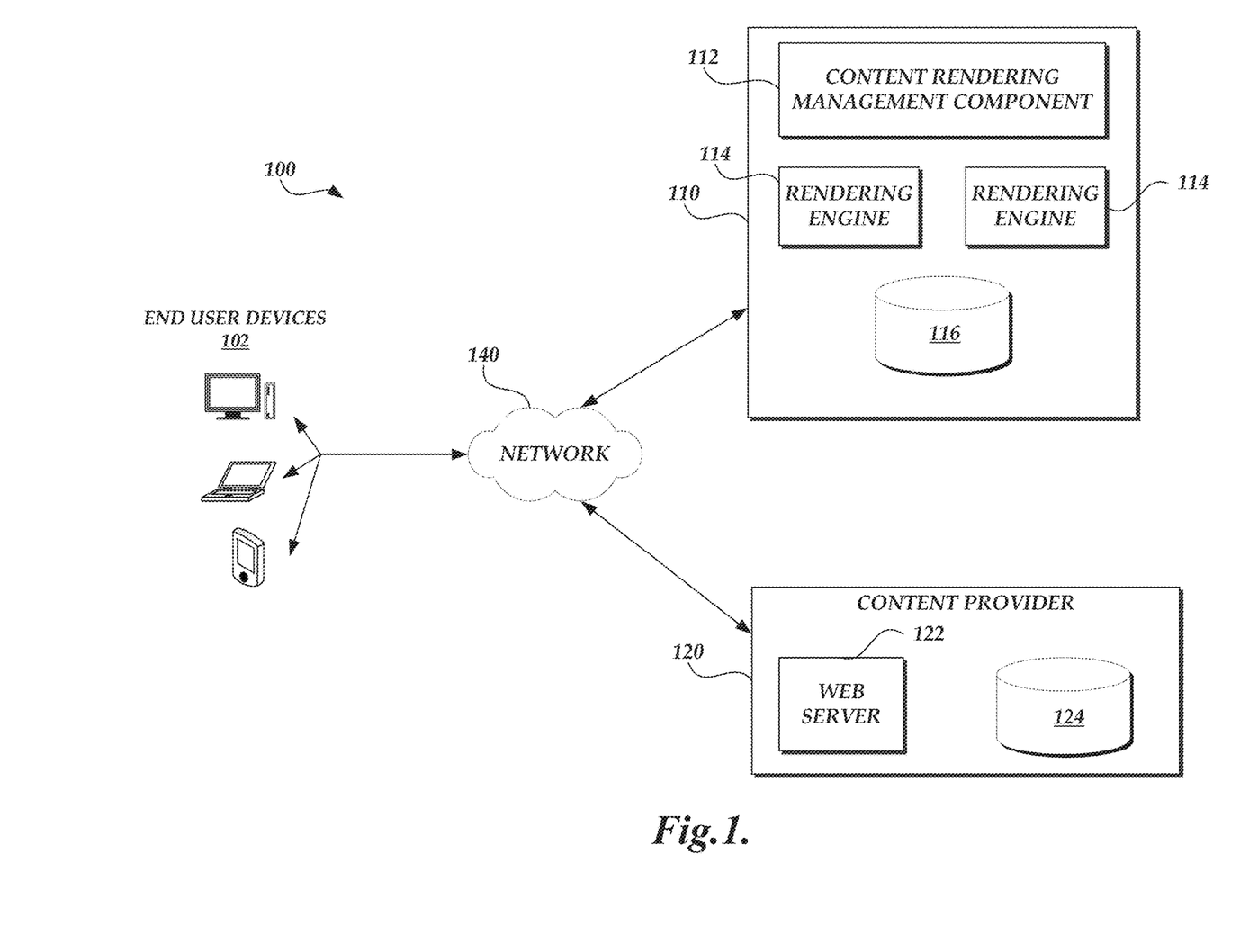
FIG. 1 is a block diagram of an illustrative operating environment in which one or more user devices communicate with content rendering service via a communication network.

FIG. 1 is a block diagram of an illustrative operating environment 100 in which one or more user devices 102 communicate with a content rendering service 110 via a network 120. The operating environment 100 also includes a number of content providers 120 for providing content to the content rendering service 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The user devices 102 may execute an application (e.g., a browser, a media player, etc.) that generates and transmits content requests.

The content rendering service 110 includes a content rendering management component 112 for processing and managing registration requests from the content providers 120, obtaining content requests from user devices 102 and selecting one or more rendering engines 114 for delivering the requested content to the requesting user device 102. Illustratively, each rendering ending 114 can correspond to one or more software applications that are able to process the content provided by the content providers 120. For example, the rendering engine 114 can, in one embodiment, obtain hypertext markup ("HTML") code and embedded resources, process scripts or other executable code and generate a format of code that can displayed on the user device.

Illustratively, the rendering engines 114 can be configured differently based on hardware or software characteristics of the user device 102, such as the browser application of the user device 102, the screen display size or resolution, processing capabilities, and the like. For example, individual rendering engines 114 can be configured or optimized to generate rendered content in formats supported exclusively by a specific software application, such as a browser application from a specific manufacturer. In another example, individual rendering engines 114 can be configured to generate rendered content based on the memory constraints of the user devices 120 or processing/rendering hardware components to decrease the time required to render images. In still a further example, individual rendering engines 114 can be configured to generate rendered content according to a quality of display resources of the user devices, such that a lower quality display of the user device may be associated with a more lossy rendering engine configuration, or a higher quality display of the user device may be associated with a more lossless rendering engine configuration.

The rendering engines 114 can further be configured based on the output of the rendered file, which can be specified by content provider 120, or user of the user device 102. In some embodiments, the content rendering management component 112 can cause the rendering engines 114 to pre-render at least a portion of content, which can be stored in data store 116. For example, the content to be rendered can include executable code to be executed as part of the rendering process, such as scripts. Accordingly, an instantiated rendering engine 114 can execute at least some of the scripts prior to receiving a request from the user devices. In another example, the content to be rendered can include multiple images or videos that may need to be processed or combined. Accordingly, an instantiated rendering engine 114 can be configured based on usage information to at least partially begin the processing in advance. In such examples, by pre-rendering content, the content rendering service 110 can decrease the amount of time required to provide substantially rendered content to requesting user devices 102. Additionally, the content rendering service 110 can also utilize pre-rendering during periods of lower activity or requests to better optimize the rendering engines' resources during periods of higher activity or requests.

As illustrated in FIG. 1, the content provider 120 can include a web server 122 for transmitting the underlying content, such as HTML pages and embedded resources. The content provider 120 can also include a data store 124 representative of the underlying embedded content and personalization information from users. One skilled in the relevant art will appreciate that a content provider 120 would include a number of additional components or processing components to interface with the content rendering management component 112 and user devices 102. Additionally, although a single content provider 120 is illustrated, the operating environment 100 can include a number of content providers 120.

The network 140 may include any wired network, wireless network, or combination thereof. For example, the network 140 may be a personal area network, local area network, wide area network, over-the-air broadcast network (e.g., for radio or television), cable network, satellite network, cellular telephone network, or combination thereof. As a further example, the network 140 may be a publicly accessible network of linked networks, possibly operated by various distinct parties, such as the Internet. In some embodiments, the network 140 may be a semi-private or private network, such as a corporate or university intranet. The network 140 may include one or more wireless networks, such as a Global System for Mobile Communications (GSM) network, a Code Division Multiple Access (CDMA) network, a Long Term Evolution (LTE) network, or any other type of wireless network. The network 140 can use protocols and components for communicating via the Internet or any of the other aforementioned types of networks. For example, the protocols used by the network 140 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 2:
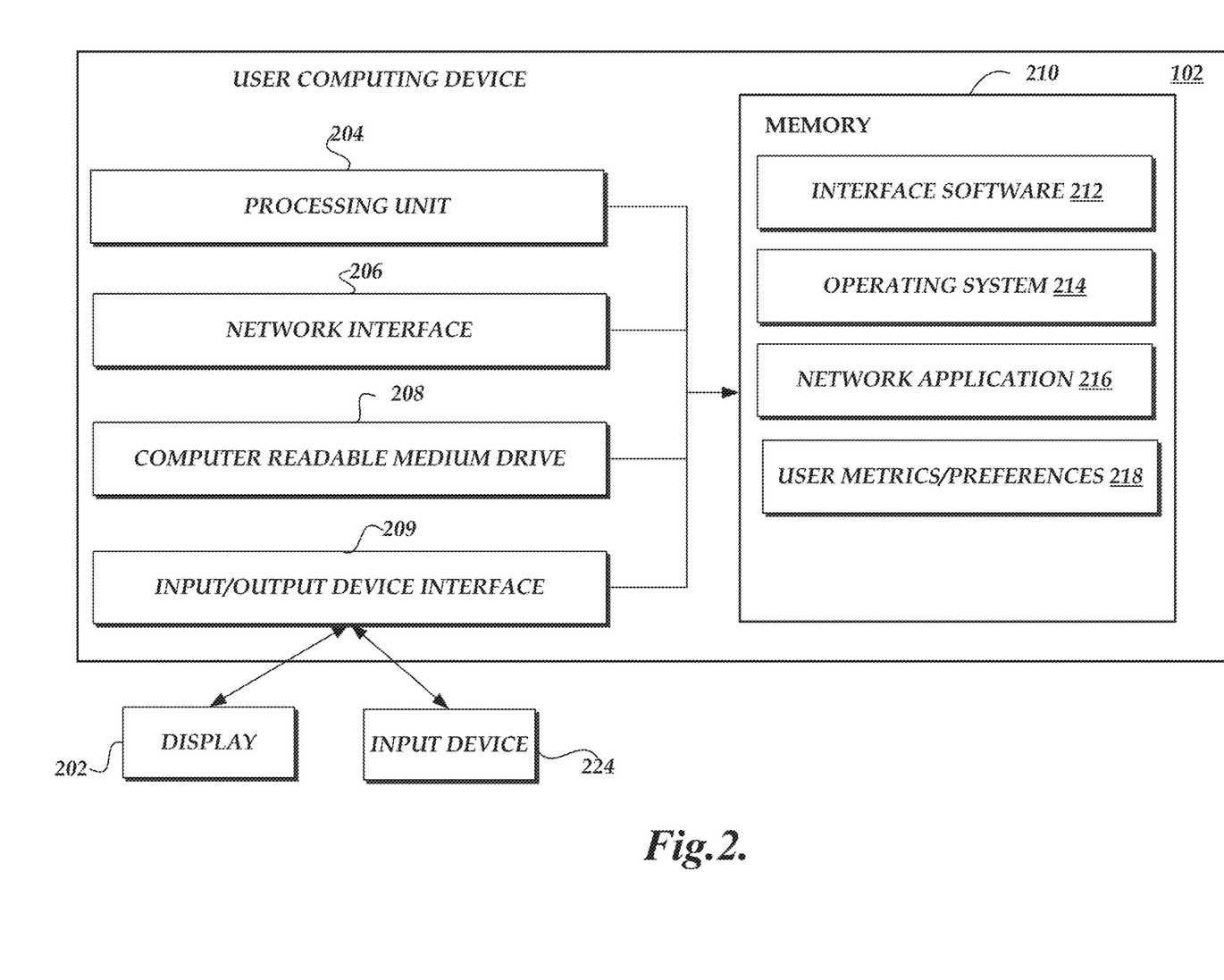
FIG. 2 is a block diagram of illustrative components of a user computing device configured to request content and receive processed content in accordance with an illustrative embodiment.

FIG. 2 depicts one embodiment of an architecture of an illustrative user computing device 102, such as a personal computer, tablet computer, smartphone, or other device, that can generate content requests and process content requests in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive 208, an input/output device interface 209, an optional display 202, and an input device 224, all of which may communicate with one another by way of a communication bus. In various embodiments, components such as the display 202 and/or the input device 224 may be integrated into the user computing device 102, or they may be external components that are coupled to the device 102.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with and processing metric information with the job management system 110. In other embodiments, the memory 210 may include a separate user metrics/preferences processing application 218 for facilitating the customization of content requests of the user, such as personalization information or customization information.

Figure 3:
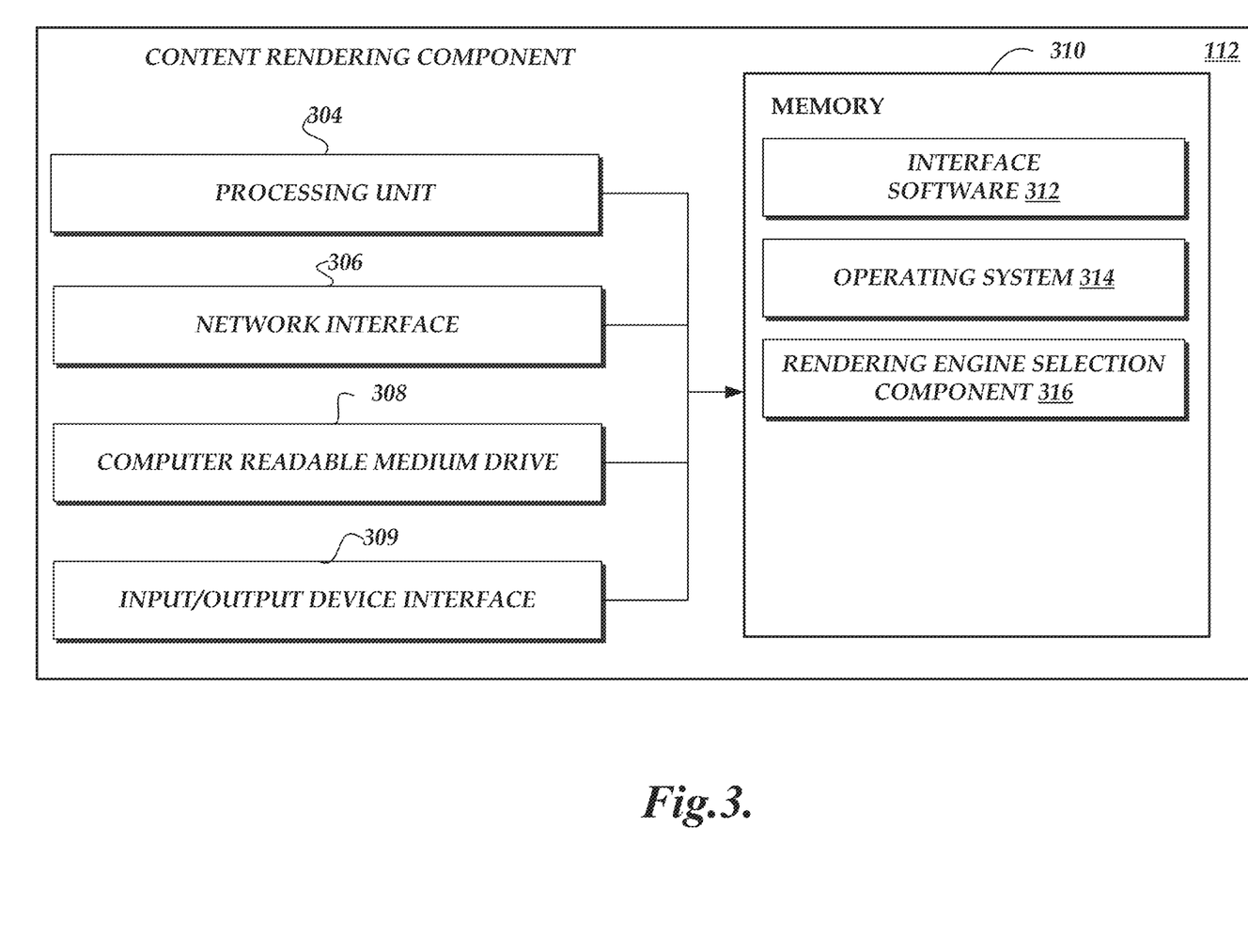
FIG. 3 is a block diagram of illustrative components of a content rendering service configured to render content for delivery to user devices in accordance with an illustrative embodiment.

FIG. 3 depicts one embodiment of an architecture of an illustrative server for implementing the content rendering management component 112 of the content rendering system 110 described herein. The general architecture of the content rendering management component 112 depicted in FIG. 3 includes an arrangement of computer hardware and software components that may be used to implement aspects of the present disclosure. As illustrated, the content rendering management component 112 includes a processing unit 304, a network interface 306, a computer readable medium drive 308, and an input/output device interface 309, all of which may communicate with one another by way of a communication bus. The components of the content rendering management component 112 may be physical hardware components or implemented in a virtualized environment.

The network interface 306 may provide connectivity to one or more networks or computing systems, such as the network 140 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the video packaging and origination service 120 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102 and for causing a content rendering engine 114 to render content responsive to a user request. Additionally, the memory 310 includes a content rendering engine selection component 316 for selecting from multiple content rendering engines based on criteria associated with the requesting user devices 102, content providers 120 and the like.

Figure 4A:
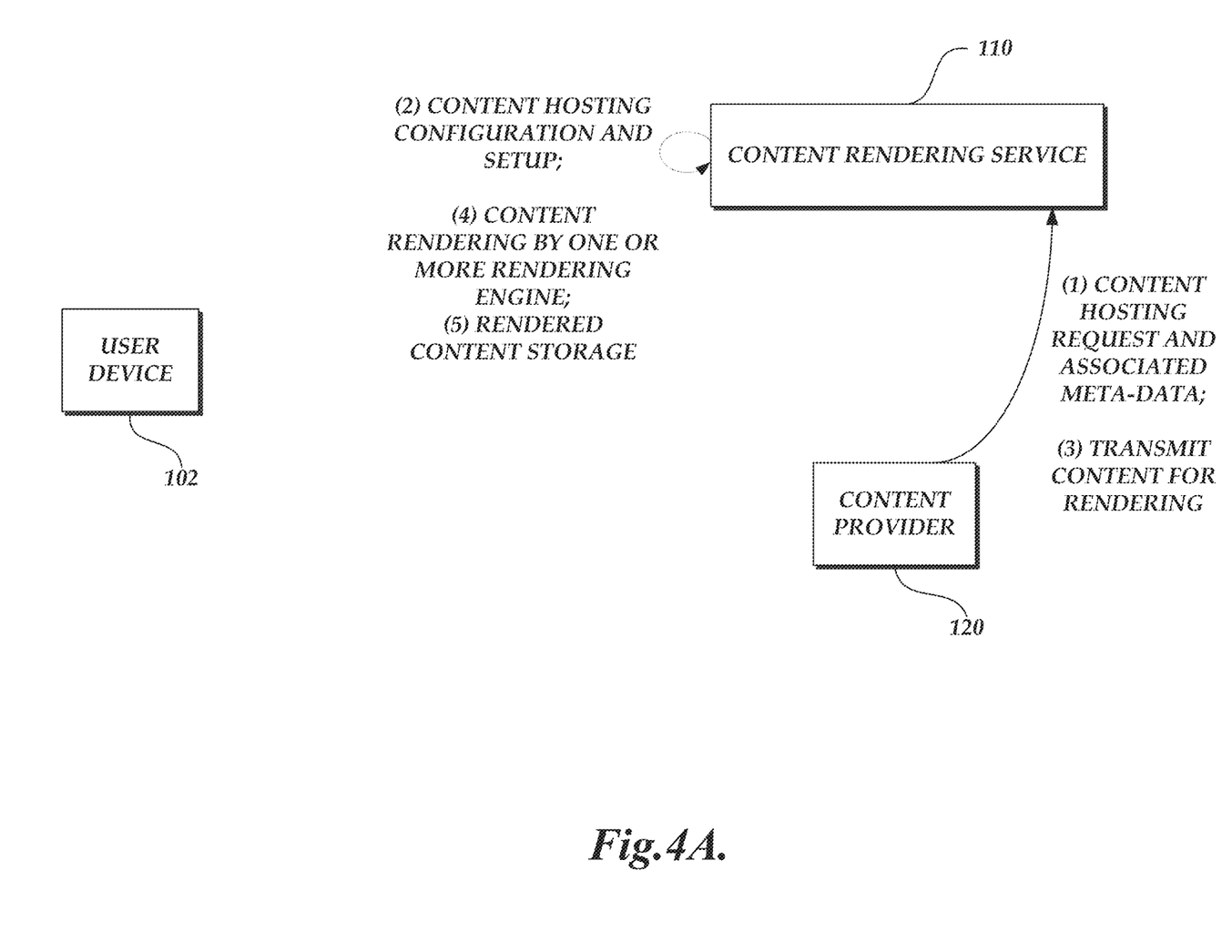
FIGS. 4A-4C are block diagrams of the content delivery environment of FIG. 1 illustrating the interaction related to user device for generating content requests and obtaining rendered content from content providers via a content rendering service.
Figure 4B:
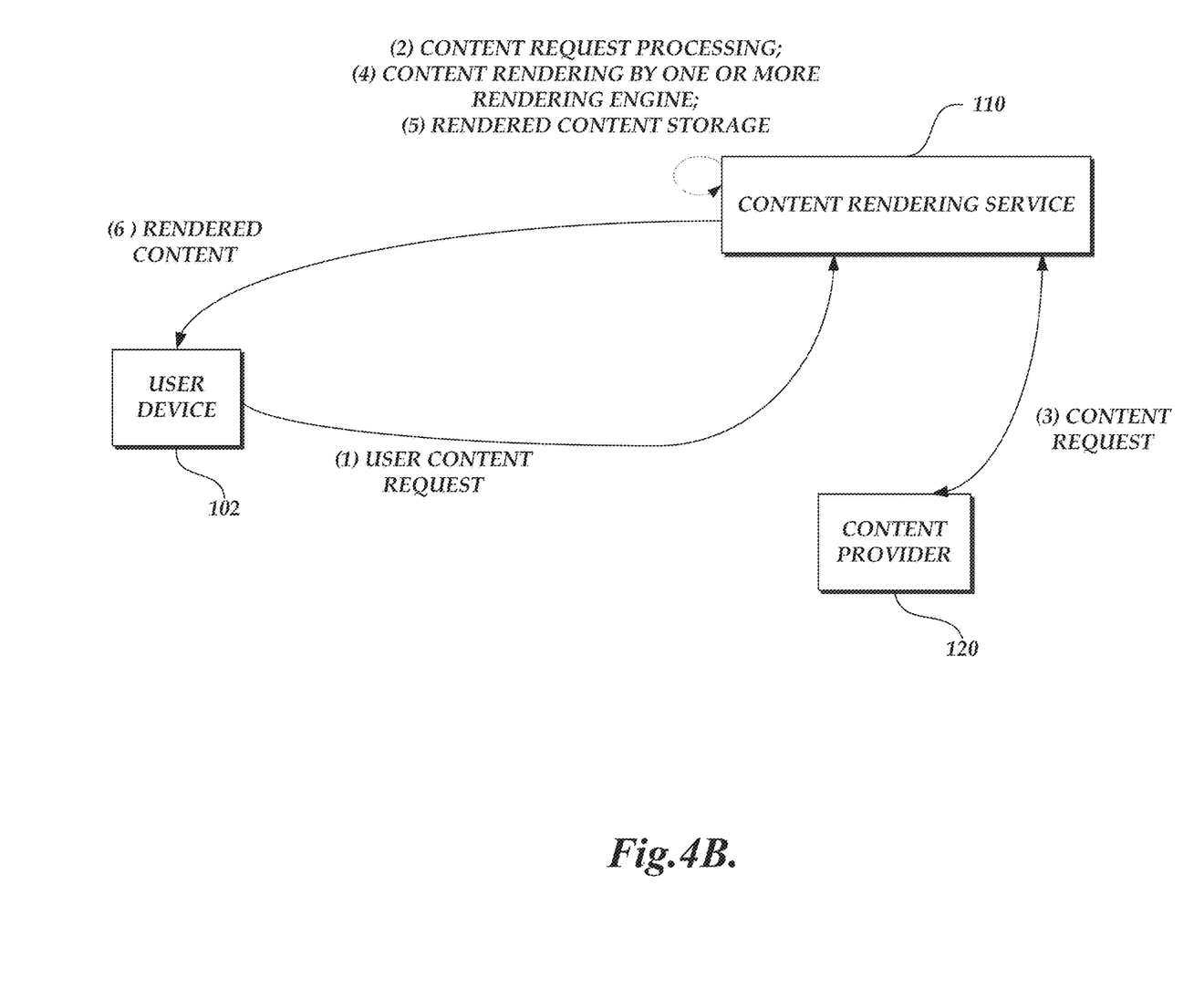
Figure 4C:
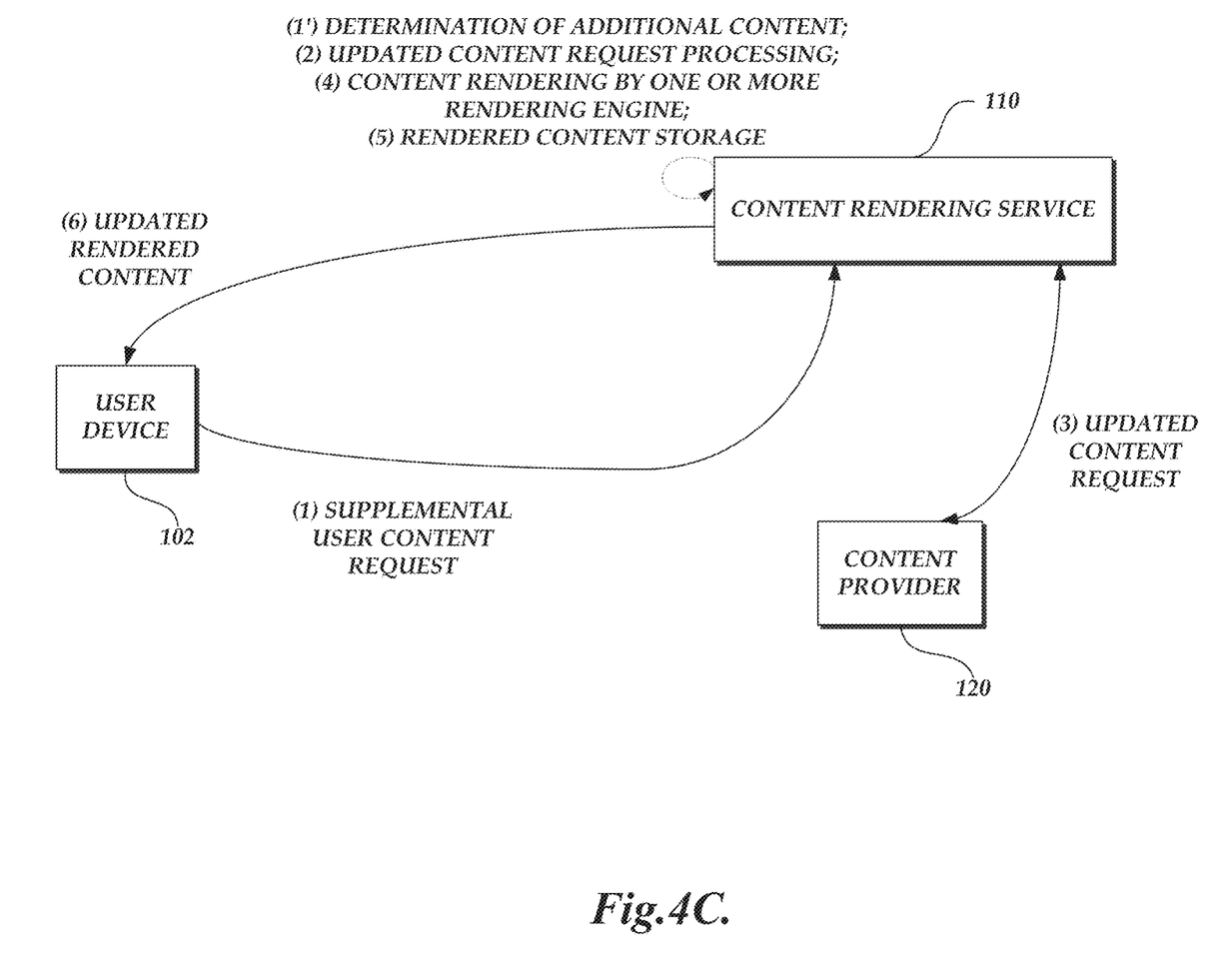

Turning now to FIGS. 4A-4C, an illustrative interaction for the processing of content requests will be described. Turning to FIG. 4A, the registration of the content provider 120 with the content rendering service 110 will be described. At (1), the content provider 120 transmits a request to the content rendering service 110 to host content. Illustratively, the content rendering service 110 will be configured to receive requests from the user devices 102 that are transmitted to a domain associated with the content provider 120. For example, a user request for a web page associated with a content provider domain will be received by the content rendering service 110. In one embodiment, the content rendering service 110 will configure or be configured to be authoritative for the content provider domains such that DNS queries for at least a subset of the requests for the domain corresponding to the content provider are resolved according to the IP address of the content rendering component 112. In other embodiments, the content rendering service 110 can be configured in accordance with other networking protocols or configurations that allow user requests to be received at the content rendering service 110.

The request to host content can include the specification of the location of the content, such as the origin servers of the content provider 120. The request can also in some embodiments include meta-data or other processing information that can specify information related to the selection of rendering engines 114 in embodiments in which multiple rendering engines are available or otherwise provide attributes utilized by individual rendering engines 114 to process content. By way of illustrative example, the meta-data can specify which rendering engines may be utilized by the content rendering component 112, including limiting formats, specifying quality requirements, the browser used by the user device 102, and the like. In other illustrative examples, the meta-data can further specify types of rendering that are allowed (e.g., a selection of specific lossless or lossy rendering) or establish thresholds or guidelines to be evaluated against potential rendering engine configurations.

At (2), the content rendering service 110 configures the content rendering engines and selection criteria for the content provider 120. In some embodiments, the content rendering management component 112 of the content rendering service 110 can instantiate virtual machine instances corresponding to the selected rendering engines or otherwise select existing virtual machine instances. The content rendering management component 112 can also generate or otherwise obtain decision making logic to allow for the selection of a rendering engine 114 based on inputted criteria. In one example, the content rendering service 110 can receive the decision making logic from the content provider 120 that establishes a selection matrix identifying acceptable or non-acceptable types, classes, or configurations of rendering engines 114. The selection matrix may be based on quality measurements, financial cost, load requirements, processing time requirements, and the like. In another example, the content rendering service 110 can receive a prioritized listing of types, classes or configurations of the rendering engines 114 such that the content rendering service 110 can do an ordered selection or select from alternative rendering engines 114 if a specified or selected rendering engine is not available for rendering content at a time of a request for processed content.

In some embodiments, the content rendering management component 112 can pre-render some portion of the content that can be combined or otherwise utilized in the substantially rendered content that is returned to subsequently requesting users. The pre-rendered content can be in the same form that the subsequently rendered content will be rendered (e.g., bitmaps, vector graphics) or some intermediary format that is associated with the type of pre-rendering. For example, the content rendering service 110 pre-renders executable code that generates values or settings that are utilized in the subsequent rendering. In these embodiments, at (3), the content provider 120 can transmit content to the content rendering component 112, such as base HTML and accompanying scripts. At (4), the rendering engines 114 can process the transmitted content, such as requesting embedded content, at least partially executing scripts or other executable code, and the like. The determination of the extent of partial execution can be specified in meta-data such as identification, by a content provider 120, of content known to be more time or processing intensive. The determination of the extent of partial execution can also be determined by usage information that identifies content that has been repeatedly processed in over some measured amount of time. At (5), the content rendering service 110 can store the pre-rendered code and include any additional processing information meta-data that may assist in combining the pre-rendered content with other subsequently rendered remaining content. As described above, however, the pre-rendering of content is optional and may be omitted altogether.

Turning now to FIG. 4B, at (1), the user device 102 transmits a request for content. Illustratively, a user can access one or more software applications on the user device to request content. For example, the user device can generate an interface for receiving user commands or interactions and transmit the request. Illustratively, the interaction with the user device 102 and the communication network 140 can leverage DNS routing to identify the IP address of the content rendering service 110 and subsequent transmissions of the content requests to the identified IP address. Other examples of routing or redirection may also be applied.

At (2), the content rendering service 110 processes the content request. In one embodiment, the content rendering service 110 can obtain user identifiers, security information, or other information that will facilitate that customization of content for an identified user. For example, the user device 102 may transmit specific authentication and authorization information (e.g., a token) that is used by the content provider 120 to provide customized or personalized content in response to a request. In some embodiments, the content rendering service 110 can maintain some form of encryption or security protocol that facilitates the exchange of user identifiers or security information between the user devices 102 and the original content provider 120 for purposes of accessing content from the content provider 120 through the content rendering service 110.

In another embodiment, the content rendering service 110 can obtain preference information, such as display preferences or rendering information, including information related to a level of service provided by the content rendering service 110. For example, a user preference may specify a minimal latency or data size that is acceptable. At (3), the content rendering service 110 obtains requested content from the content provider 120. As will be described in detail below, in some embodiments, the content provider 120 may continue to provide content to the content rendering service 110 with or without additional user requests. Accordingly, the content rendering service 110 can provide updates to the user device 102 after the transmission of an original set of rendered content.

At (4), the content rendering service 110 selects one or more rendering engines 114 for rendering the content. As described above, the content rendering service 110 can utilize the decision making logic or configuration data to select a rendering engine 114 for generated substantially processed content. In one example, the content rendering service 110 can receive the decision making logic from the content provider 120 that establishes a selection matrix identifying acceptable or non-acceptable types, classes, or configurations of rendering engines 114. The selection matrix may be based on quality measurements, financial cost, load requirements, processing time requirements, and the like. In another example, the content rendering service 110 can receive a prioritize listing of types, classes or configurations of the rendering engines 114 such that the content rendering service 110 can do an ordered selection or select from alternative rendering engines 114 if a specified or selected rendering engine is not available for rendering content at a time of a request for processed content.

In other embodiments, the content rendering service 110 can select from multiple available multiple rendering engines 114 to make multiple rendered versions available, such as in two distinct formats. As described above, the content rendering service 110 can utilize criteria submitted by the content provider 120, user devices 102, or other configuration data to select from multiple, available rendering engines 114. At (5), the stores the rendered content and at (6) transmits the rendered content to the requesting user device 102.

In addition to the initial rendering of content, in some embodiments, the content rendering service 110 can continue to provide rendered content to the user devices. As described above, in one embodiment, a user device can interact with the rendered content to cause the generation of additional content (e.g., selection of display objects, generation of input data, and the like). In another embodiment, the rendered content can be updated without a request from the users, such as via automatic refresh of content after a fixed amount of time or after initiation of an update provided by the content provider 120. With reference to FIG. 4C, at (1), the user device 102 transmits a request for updated content. Illustratively, a user can access one or more software applications on the user device to request updated content, such as the specification of information in a textual field or the selection of particular content. In another example, if the rendered content is dynamic in nature, the update of the content can be generated by the content rendering management component 112 without requiring additional input.

At (2), the content rendering service 110 processes the updated content request. In one embodiment, the content rendering service 110 can receive user identifiers, security information, or other information that will facilitate that customization of content for an identified user. Illustratively, the user identifiers, security information, or other information can be included in the original request or otherwise transmitted from the user device 102 or a third-party service. In another embodiment, the content rendering service 110 can obtain updated preference information, such as display preferences or rendering information, including information related to a level of service provided by the content rendering service 110. The preference information may be maintained by the content rendering service 110 as part of a registration process by the content provider 110, user device 102, or a combination. For example, a user preference may be included in a request that specifies a minimal latency or data size that is acceptable. At (3), the content rendering service 110 obtains requested content from the content provider 120.

At (4), the content rendering service 110 selects one or more rendering engines 114 for rendering the updated content. As described above, the content rendering service 110 can utilize the business logic or configuration to determine which rendering engine 114 will be utilized. In other embodiments, the content rendering service 110 can select multiple rendering engines 114 to make multiple rendered versions available, such as in two distinct formats. In this embodiment, the content rendering service 110 can select the same instance of the rendering engine 114 as previously selected or alternatively render a new version altogether. At (5), the content rendering service 110 stores the rendered content and at (6) transmits the rendered content to the requesting user device 102.

Figure 5:
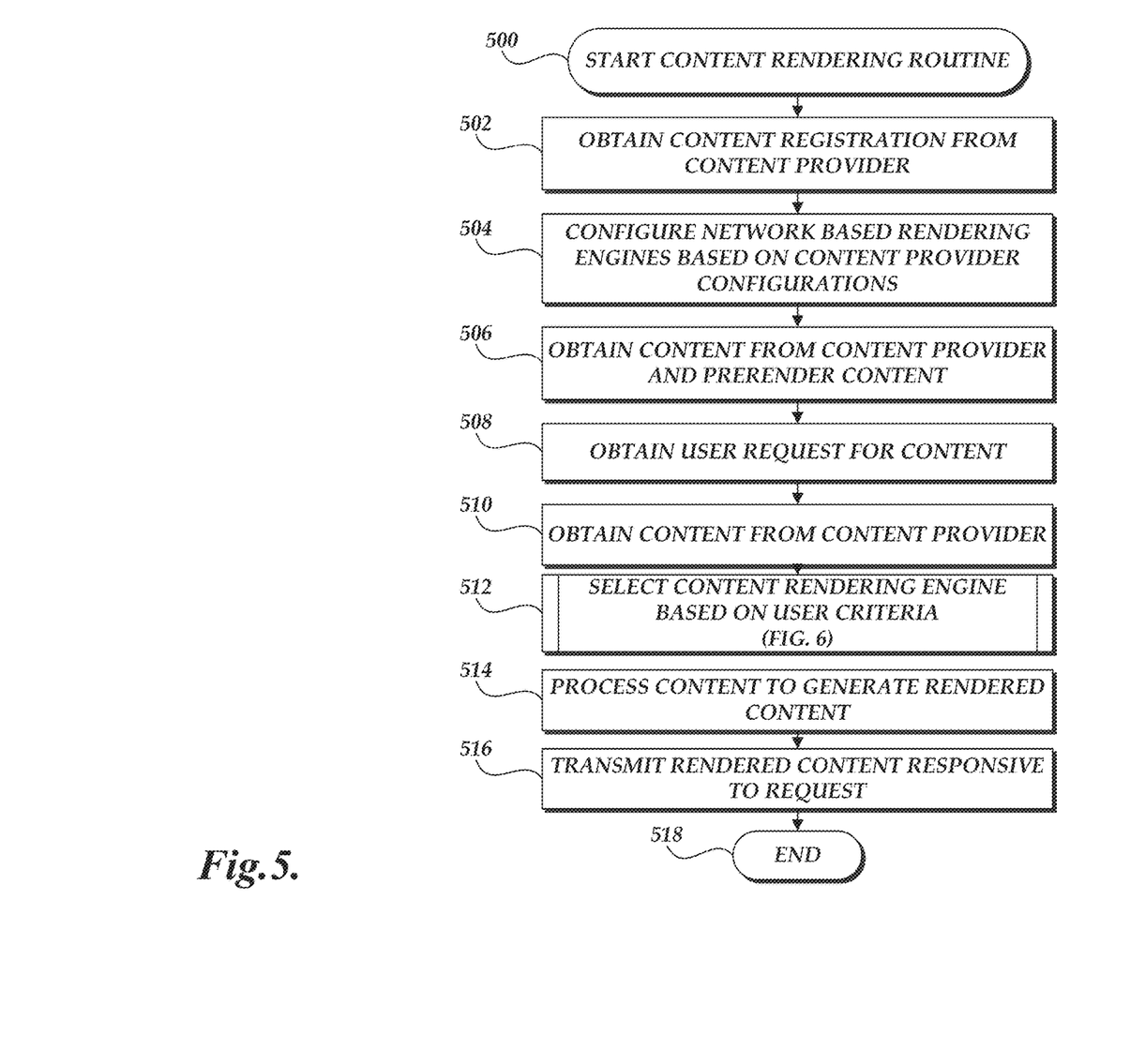
FIG. 5 is a flow diagram illustrative of a content processing routine implemented by a content rendering service.

Turning now to FIG. 5, a routine 500 illustrating a content rendering routine implemented by the content rendering management component 112 of the content rendering service 110 will be described. At block 502, the content rendering management component 112 receives a request from the content provider 120 to host content. Illustratively, the content rendering management component 112 will be configured such that requests for content from user devices 102 will be directly or indirectly received by the content rendering management component 112. For example, DNS infrastructure may be configured such that DSN queries for at least a subset of the requests for the domain corresponding to the content provider can be resolved according to the IP address of the content rendering component 112 rather than an IP address associated with the origin servers of the content provider 120.

As described above, the request to host content provided by the content provider 120 can include the location of the content, such as IP addresses of origin servers. The request can also in some embodiments include meta-data that can specify information related to the selection of rendering engines or attributes utilized by the rendering engines. By way of illustrative example, the meta-data can specify which rendering engines may be utilized by the content rendering component 112, including limiting formats, specifying quality requirements, and the like.

At block 504, the content rendering management component 112 configures the content rendering engines and selection criteria for the content provider 120. In some embodiments, the content rendering management component 112 can instantiate virtual machine instances corresponding to the selected rendering engines or otherwise select existing virtual machine instances. The content rendering management component 112 can also generate or otherwise obtain decision making logic to allow for the selection of a rendering engine 114 based on inputted criteria.

As previously described, in some embodiments, the content rendering management component 112 can pre-render some portion of the content. Accordingly, at block 506, the content provider 120 can transmit content to the content rendering component 112, such as base HTML and accompanying scripts. Additionally, at block 506, the rendering engines 114 can process the transmitted content, such as requesting embedded content, at least partially executing scripts or other executable code, and the like. As described above, the content rendering management component 112 can pre-render content so that the pre-rendered content can be combined or otherwise utilized in the substantially rendered content that is returned to subsequently requesting users. The pre-rendered content can be in the same form that the subsequently rendered content will be rendered (e.g., bitmaps, vector graphics) or some intermediary format that is associated with the type of pre-rendering. For example, the content rendering service 110 pre-rendering executable code that generates values or settings that are utilized in the subsequent rendering. The content rendering management component 112 can store the pre-rendered code.

At block 508, the content rendering management component 112 obtains a user request from the user device 102 for content. Illustratively, a user can access one or more software applications on the user device to request content. For example, the user device can generate an interface for receiving user commands or interactions and transmit the request. Illustratively, the interaction with the user device 102 and the communication network 140 can include the routing of DNS queries to identify the IP address of the content rendering management component 112 and the transmission of the content request to the identified IP address. Additionally, as described above, the user request can include identifiers or other preference information that will be utilized in subsequent processing.

At block 510, the content rendering management component 112 processes the content request and obtains content. In one embodiment, the content rendering management component 112 can obtain user identifiers, security information, or other information that will facilitate that customization of content for an identified user. In another embodiment, the content rendering management component 112 can obtain preference information, such as display preferences or rendering information, including financial information related to a level of service provided by the content rendering service 110. For example, a user preference may specify a minimal latency or data size that is acceptable.

Figure 6:
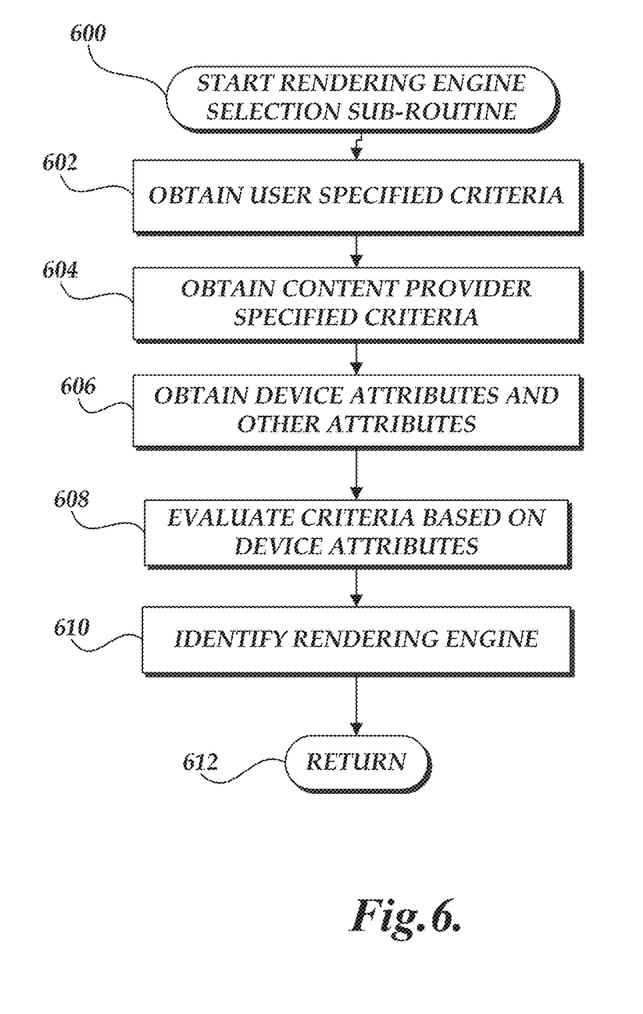
FIG. 6 is a flow diagram illustrative of a rendering engine sub-routine implemented by a content rendering service.

At block 512, the content rendering management component 112 selects one or more rendering engines 114 for rendering the content. As described above, the content rendering management component 112 can utilize the business logic or configuration to determine which rendering engine 114 will be utilized. In other embodiments, the content rendering management component 112 can select multiple rendering engines 114 to make multiple rendered versions available, such as in two distinct formats. An illustrative sub-routine 600 will be described with regard to selection of a rendering engine 114. At block 514, the content rendering management component 112 processes the content to generate a processing result and stores the rendered content. Illustratively, the processing result from the rendering engine 114 is in a substantially rendered or fully rendered format such that the received user devices 102 are not required to request additional resources from the content provider (or other source), process the content to determine additional rendering or display values, have the ability to omit at least some of the specified resources, or some combination thereof. The amount of additional processing or other activity required by the user device can be limited according to thresholds (e.g., maximum data amounts, maximum processing time, maximum resource consumption) or otherwise specified by the content rendering service 110.

At block 516 transmits the rendered content to the requesting user device 102. The routine 500 terminates at block 518.

Turning now to FIG. 6, a sub-routine 600 for selecting a rendering engine to process a content request will be described. Illustratively, sub-routine 600 may be invoked as part of the processing of content requests by a content rendering management component 112 as described in routine 500 with regard to block 512. Accordingly, sub-routine 600 will be described after a request for content has been received. At block 602, the content rendering management component 112 obtains user specified criteria. As described above, users can be associated with profiles or preferences that can be utilized in decision making logic to select a rendering engine. By way of illustrative example, the user specified preferences can include, but are not limited to specifying formats for rendered content, selecting quality thresholds or minimums, identifying a total amount of processing time or service level agreements, establishing financial cost criteria or attributed financial cost criteria, and the like.

At block 604, the content rendering management component 112 obtains content provider specified criteria. As described above, content providers can be associated with profiles or provide meta-data in the delivered content that can be utilized in decision making logic to select a rendering engine. By way of illustrative example, the content provider specified preferences can include, but are not limited to specifying specific formats for rendered content, selecting quality thresholds or minimums in the generation of the rendered content, identifying a total amount of processing time or service level agreements, establishing financial cost criteria or attributed financial cost criteria, establishing maximum error rates, and the like.

At block 606, the content rendering management component 112 obtains device attributes or other attributes. As described above, the content rendering management component 112 can utilize hardware and software attributes of the user device or the communication network to select from rendering engines. Examples include, but are not limited to, screen size or resolution, processing resources and load for ability to complete rendering, network conditions (e.g., network bandwidth or network throughput), software application or component types or versions, operating environments types or versions, general operating characteristics of the device, general operating characteristics of a communication network, and the like.

At block 608, the content rendering management component 112 evaluates the collected criteria based on attributes. In one example, the content rendering management component 112 can establish a selection matrix identifying acceptable or non-acceptable types, classes, or configurations of rendering engines 114. The selection matrix may be based on received criteria from the user, content provider or other administrator. Additionally the selection matrix can also prioritize criteria in the event of conflicts or if the criteria are considered incompatible. Based on the selection matrix or decision making rules, the content rendering management component 112 can identify a rendering engine 114 at block 610. In one embodiment, the content rendering management component 112 can select a single rendering engine from the decision making logic. In other embodiments, the content rendering management component 112 can receive a prioritize listing of types, classes or configurations of the rendering engines 114 such that the content rendering service 110 can do an ordered selection or select from alternative rendering engines 114 if a specified or selected rendering engine is not available for rendering content at a time of a request for processed content. At block 612, the sub-routine terminates and returns the selection of one or more rendering engines.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for managing the delivery of content, the system comprising:
   one or more computing devices associated with a content rendering service, wherein the content rendering service is configured to:
      obtain a request for a web page from a browser application on a user device associated with a user, the request from the browser application on the user device directed to a domain name associated with a content provider;
      request content from the content provider corresponding to the requested web page;
      obtain rendering engine selection criteria associated with the user and the content provider and device attributes associated with the user device;
      establish a selection matrix identifying acceptable or non-acceptable types, classes or configurations of rendering engines of a plurality of rendering engines, the selection matrix further prioritizing obtained rendering engine selection criteria;
      evaluate the rendering engine selection criteria based on the device attributes to identify a rendering engine;
      using the selection matrix, perform an ordered selection based on the identified rendering engine to automatically select a rendering engine from the plurality of rendering engines to generate a rendered result; and
      transmit the rendered result from the selected rendering engine to the user device responsive to the request from the browser application.

2. The system of claim 1, wherein the content rendering service obtains an update to the request from the user device, and wherein the content rendering service processes updated content responsive to the update to the request from the user device.

3. The system of claim 2, wherein the content rendering service selects the rendering engine to generate the updated result.

4. The system of claim 2, wherein the content rendering service selects an additional rendering engine to generate the updated result.

5. A computer-implemented method, comprising:
receiving a request for content directed to a domain name from a browser application on a user device;
establish a selection matrix identifying acceptable or non-acceptable types, classes or configurations of rendering engines of a plurality of rendering engines, the selection matrix further prioritizing obtained rendering engine selection criteria;
evaluate the rendering engine selection criteria based on attributes of the user device to identify a rendering engine;
using the selection matrix, perform an ordered selection based on the identified rendering engine to automatically select at least one rendering engine from a set of available rendering engines to generate a rendered result; and
transmitting, from the selected rendering engine, the rendered result responsive to the request from the browser application on the user device.

6. The computer-implemented method of claim 5, wherein receiving the request for content includes receiving a user identifier, the attributes of the user device, or user preference information.

7. The computer-implemented method of claim 5, wherein automatically selecting from the set of available rendering engines includes automatically selecting based on hardware attributes of the user device or software attributes of the user device.

8. The computer-implemented method of claim 5, wherein selecting from the set of available rendering engines includes selecting based on user specific selection criteria.

9. The computer-implemented method of claim 5, wherein automatically selecting from the set of available rendering engines includes automatically selecting based on content provider specified criteria.

10. The computer-implemented method of claim 5, wherein automatically selecting from the set of available rendering engines includes automatically selecting based on evaluating rules identifying a rendering engine based on an attribute.

11. The computer-implemented method of claim 5 further comprising:
obtaining a request from a content provider to configure the content rendering service to deliver content on behalf of the content provider; and
causing the content rendering service to receive requests directed to a domain associated with the content provider.

12. The computer-implemented method of claim 5 further comprising:
obtaining an update to the request from the browser application on the user device; and
processing updated content responsive to the update to the request from the browser application on the user device.

13. The computer-implemented method of claim 5 further comprising requesting the content from a content provider responsive to receipt of the request from the browser application on the user device.

14. The computer-implemented method of claim 5 further comprising obtaining at least a portion of the content from a content provider prior to receipt of the request from the browser application on the user device and pre-rendering the at least a portion of the content from the content provider.

15. The computer-implemented method of claim 5 further comprising processing the content from a content provider to generate the rendered result, wherein processing the content from the content provider to generate the rendered result includes processing the content based on meta-data provided by the content provider.

16. The computer-implemented method of claim 5 further comprising processing the content from a content provider to generate the rendered result, wherein processing the content from the content provider to generate the rendered result includes processing the content based on preferences associated with a user of the user device.

17. A computer-implemented method for delivering content comprising:
receiving, at a service provider independent from a content provider, a request for content from a software application, the request from the software application directed to a domain name associated with a content provider;
prioritizing, by the service provider, rendering engine selection criteria;
establishing, by the service provider, a selection matrix identifying acceptable or non-acceptable types, classes or configurations of rendering engines of a plurality of rendering engines, the selection matrix further including the prioritized rendering engine selection criteria;
evaluating, by the service provider, the rendering engine selection criteria to identify a rendering engine;
using the selection matrix, perform, by the service provider, an ordered selection based on the identified rendering engine to automatically determine a rendering engine from the plurality of rendering engines configured to generate a rendered result; and
transmitting, by the service provider, the rendered result responsive to the request from the software application.

18. The computer-implemented method of claim 17, wherein receiving the request for content includes receiving a user identifier, attributes of a user device, or user preference information.

19. The computer-implemented method of claim 17 further comprising:
obtaining an update to the request from the user; and
processing updated content responsive to the update to the request from the user.

20. The computer-implemented method of claim 19, wherein the processing updated content includes processing by the determined rendering engine.

21. The computer-implemented method of claim 17, wherein determining the rendering engine includes determining a rendering engine based on network conditions.

* * * * *